Figure 4:
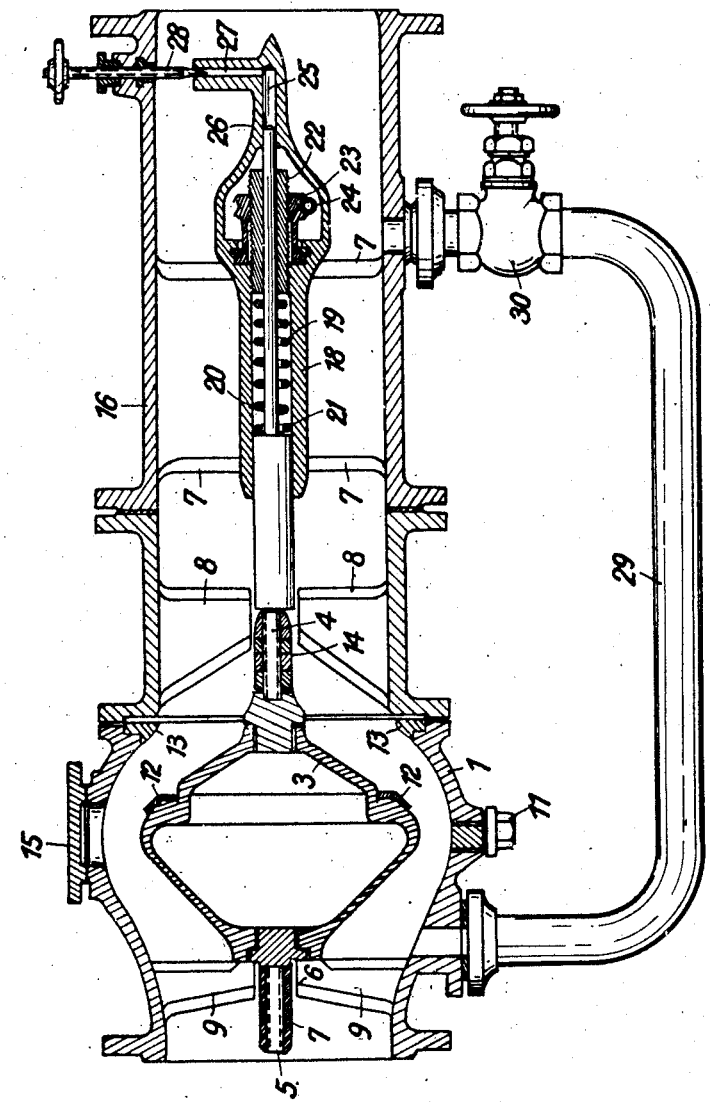

April 23, 1929.　　　　K. HASSOLD　　　　1,710,214
VALVE FOR HYDRAULIC MAINS
Filed Jan. 12, 1928　　　2 Sheets-Sheet 1
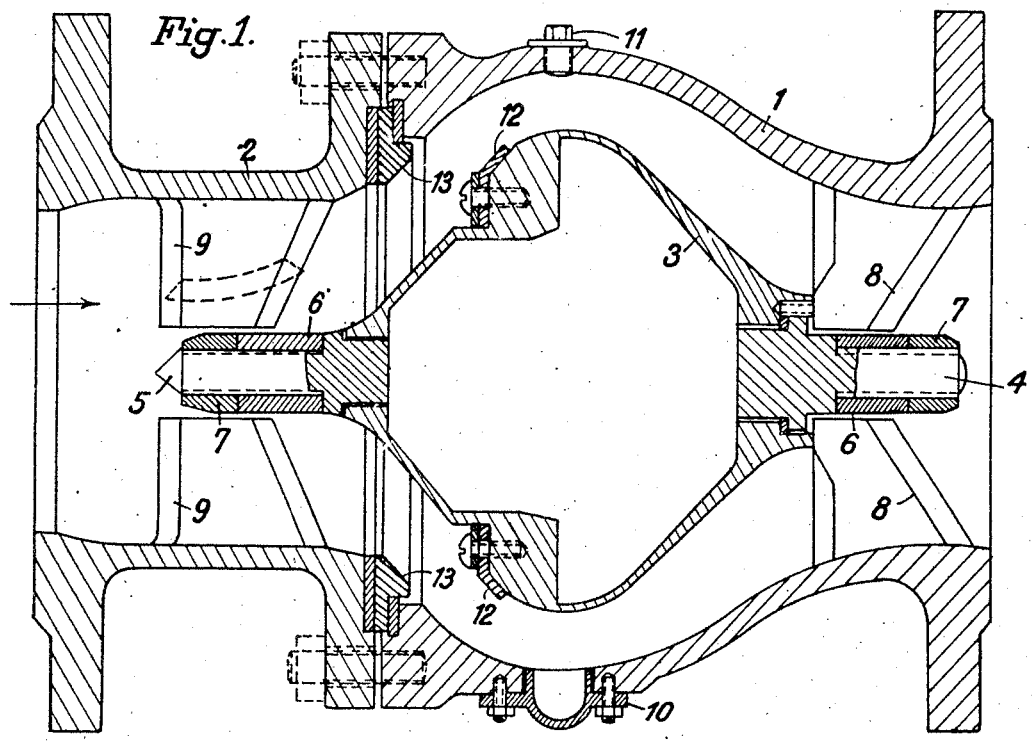
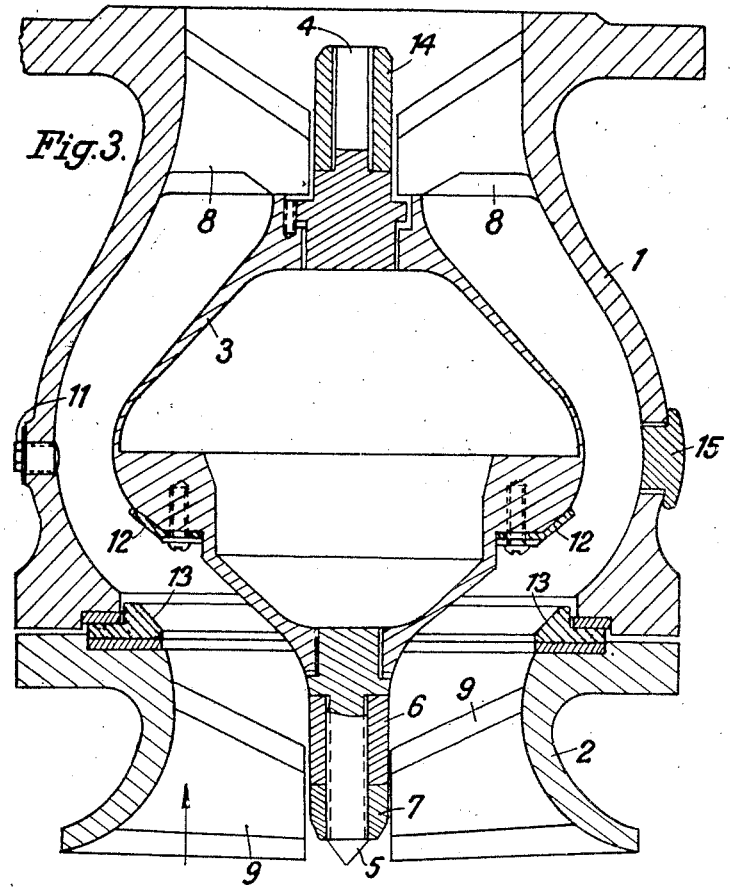
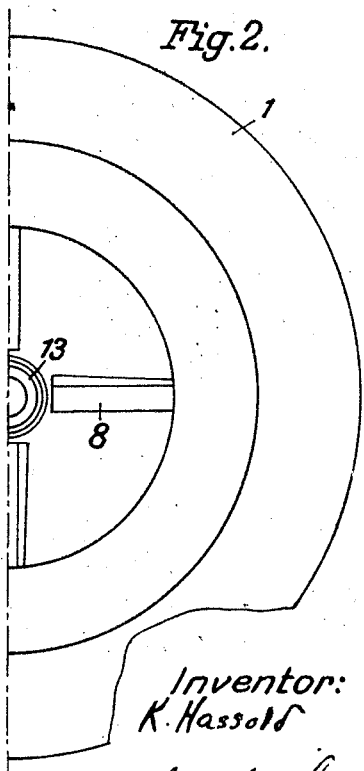
Inventor:
K. Hassold Patented Apr. 23, 1929.

1,710,214

UNITED STATES PATENT OFFICE.

KARL HASSOLD, OF NUREMBERG, GERMANY, ASSIGNOR TO ARMATUREN- & MASCHI-NENFABRIK A.-G. VORM. J. A. HILPERT, OF NUREMBERG, GERMANY.

VALVE FOR HYDRAULIC MAINS.

Application filed January 12, 1928, Serial No. 246,313, and in Germany October 7, 1926.

This invention relates to valves for hydraulic mains and more particularly to a non-return or check valve, which is constructed as a foot valve, and, if desired, by means of a special appliance, as an automatic stop valve or pipe-fracture valve. In all these valves the basic idea of the invention resides in the fact that the valve cone is formed as a float.

It often happens that horizontally working non-return or check valves have to open or close immediately upon the occurrence of the smallest velocities of the liquid. This is more particularly the case with valves which automatically regulate the admission and discharge of water in elevated reservoirs and in valves which permit a flow through tanks when there is only a single pipe to the tank, which serves simultaneously as an admission and discharge pipe. In these cases the ordinary valves or flap valves hitherto known do not prove satisfactory, since after a short time great frictional resistances usually arise therein owing to corrosions in the joints and guides, or by the formation of incrustations, quite apart from the fact that from the outset the resistances to opening and closing are already very great.

According to the present invention these disadvantages are obviated by constructing the valve body, which in a known manner is of double conical shape, as a horizontally guided float. Now in order that the floating valve body may float in the liquid exactly in its horizontal position, according to the invention weighting rings are mounted or screwed onto the two trunnion-like ends of the double conical float body, and these rings act as guiding trunnions or journals to provide a frictionless guide for the valve body in its casing and to enable the weight or buoyancy of the float to be adjusted.

A known phenomenon in valves in hydraulic mains is the settling of rust, mud, and particles of sand on valve surfaces and guides. Owing to these foreign bodies and owing to incrustation, the frictional resistance is greatly increased after the lapse of time. In order to obviate this disadvantage, according to the invention the guiding ribs of the casing serve directly to support the valve trunnions without the interposition of a boss. The guiding ribs are bevelled towards the axis, have sharp edges for the purpose of diminishing the resistances to flow, and extend somewhat obliquely in relation to the longitudinal axis. In this way the result is obtained that the valve body, when liquid is flowing through, executes a slight rotational movement so that the seat surfaces are continually changing and an automatic cleaning is continually taking place on the guides. The valve is therefore not merely kept clean by this rotary movement but will always float in the water without friction.

The non-return valve according to the invention may also be constructed as a foot valve or an intermediate valve in vertical pipes. In this case the regulating of the weight is obtained by means of rings mounted or screwed upon the lower trunnion of the valve body, these rings then forming in their entirety the guiding trunnion for the ascending and descending valve.

Since the valves of which the valve bodies are constructed as floats have an exceedingly small frictional resistance, they are suitable for acting, in combination with a special appliance as automatic stop valves or pipe-fracture valves. For this purpose there is fitted onto the casing of the float valve a further casing, in which is located an appliance for bringing about the automatic closure of the float cone in the event of a pipe breaking. According to the invention the trunnion of the non-return valve bears against a slidable rod which is subject to spring pressure or is loaded by means of a weight. The stress in the spring or the weight of the load is adapted to the flow pressure acting upon the valve cone at which the valve is required to close. The adaptation of the spring pressure to which the adjustable rod is subject is effected by means of gearing to be operated from outside. The regulating of the weight load may be effected in a similar manner. In order that in the event of a pipe fracture occurring suddenly the valve may not strike hard against its seat, the rear end of the adjustable spring-actuated rod serves at the same time as a brake piston, which expels the liquid present in its bore, in an adjustable manner if desired, as the valve closes. Finally, between the casing of the float valve and the casing for the pipe-fracture safety device, a by-pass connection is provided, the object of which is to allow the pressure beyond the float cone to rise slowly again in the event of a sudden withdrawal of water. This hitherto unknown arrangement of the by-pass connection accordingly effects a compensation for the differences of pressure before and behind the valve cone, the spring or weight loading of the valve comes into action again, and the valve opens quite automatically. While in the case of the pipe-fracture valves of known construction an operation is necessary in order to return the valve to its normal working condition, no such operation is required with the valve according to the present invention.

Various constructional examples of the invention are illustrated in the accompanying drawings, wherein Fig. 1 is a longitudinal section through the non-return valve with a horizontally guided float cone, Fig. 2 is an end elevation of the valve casing, with the somewhat obliquely positioned guiding ribs, Fig. 3 is a longitudinal section through the non-return valve, employed as a foot valve with a vertically guided float cone, and Fig. 4 is a longitudinal section through the non-return valve in combination with a pipe-fracture safety device.

As will be seen from Figure 1, the casing for the non-return valve consists of a convex part 1, and a tubular part 2 connected therewith. The valve body 3 is of double conical or stream-line shape, and is constructed as a float. Journals or trunnions 4 and 5 located to left and right of the double cone serve for the reception of weighting rings 6 and 7, which are slipped or screwed onto them. According to the size and number of these weighting rings the weight of the float cone 3 can be so adjusted that it is equal to its buoyancy, as a result of which the cone floats in a horizontal position. The weighting rings at the same time form guiding journals, which are supported with slight clearance between inwardly directed guiding ribs 8 and 9 on the casing 1, 2. The breadth of the guiding ribs sharply decreases in an inward direction and the edges on both sides are bevelled, as will be seen from the cross section of the rib 9 shown in Figure 1. Furthermore they extend somewhat obliquely in relation to the axis, so that a rotary movement is imparted to the water flowing through and therefore also to the valve cone. This rotary movement prevents incrustation at the guiding positions and brings with it a change in the valve seating surfaces. Into the lower part of the casing is bolted a closure cap 10, which enables deposited particles to be removed from the casing, while at the upper part a ventilating screw 11 is provided. As the water flows through, the valve adjusts itself into the position shown in Figure 1, in which the valve cone 3 bears against the ribs 8. In the event of a back pressure the valve shifts towards the left and closes with its packing 12 on the valve seat 13.

In Fig. 3 this non-return valve is constructed as a foot valve. The float cone 3 moves up and down in a vertical direction, its weight likewise being balanced by weighting rings 6 and 7 screwed onto it.

The range of the applicability of such valves is not limited merely to reservoir appliances but these valves may also be advantageously employed wherever it is a question of saving resistance, for example as flap valves and foot valves in pumps. The fact of the valves being almost completely frictionless enables them to open and close with very slight losses of pressure or resistances to flow. In the case of the employment of the non-return valve as a foot valve or as an intermediate valve in vertical pipes, preferably only the lower guiding trunnion 5 is provided with weighting rings, while the upper guiding trunnion is constructed as a simple light guiding pin 14. The result is obtained that the centre of gravity of the valve cone is located lower down than the centre of gravity of the mass of liquid displaced by the valve cone. As in the case of the metacentre of ships, the valve cone always adjusts itself automatically into a vertical position by the relative displacement of the positions of the two centres of gravity. The vertical position is thereby ensured in every case. The cleaning cap is in this case replaced by a special flange 15, while the ventilating screw is omitted.

The float valve, as will be seen from Fig. 4, may be constructed, by means of suitable appliances, as an automatic stop valve or pipe-fracture valve, either for vertical or for horizontal means.

In the constructional example illustrated in Fig. 4, beside the casing 1, 2 of the float valve a special tube member 16 containing the pipe fracture safety device, is attached. The casing 16 for the pipe fracture safety device is provided with a long guiding boss 18, which is connected with ribs 17 and in which an adjusting pin 19 is slidable. This adjusting pin is subject to the pressure of a spring 20, one end of which bears against a shoulder 21 on the guiding pin, while the other end bears against the screw-threaded nut 22. The stress in the helical spring 20 corresponds to a certain pressure of flow in the valve casing 1, 2, so that the float cone 3 remains stationary as long as the velocity remains below that which corresponds to the aforementioned pressure of flow. For the purpose of adapting the apparatus to different pressures of flow an adjusting device is provided which consists of gearing to be operated from outside, in the present case a worm gear. Upon the screw-threaded nut 22 is mounted a small worm wheel 23, which can be rotated by means of a worm 24. By rotating the worm wheel the nut is screwed to and fro, whereby the stress in the spring can be altered. The right hand end of the adjusting rod 19 is supported in a cylindrical bore 25 in a casting 26 enclosing the worm gear. This bore opens into a lateral passage 27, the aperture of which can be enlarged or diminished by means of a needle valve 28 adjustable from outside.

If a fracture of the pipe occurs, the velocity of the liquid flowing through increases beyond the valve body 3, and accordingly the pressure of flow upon the float cone also increases. The latter travels towards the right, overcoming the force of the spring, and is pressed onto its seat, so that the pipe is closed. The spring 20 thus becomes compressed.

In order to obviate a heavy impact of the float body 3 against its valve seat 13 a braking device is provided. During the displacement of the adjusting rod 19 towards the right, the right hand end of this rod presses upon the liquid located in the cylindrical bore 25 of the casting 26 and expels this liquid through the narrow side passage 27 more or less slowly, according to the cross sectional area of the aperture left open by the adjusting needle 28. The increase in the stress in the spring arising during the displacement of the adjusting rod 19 towards the right likewise exerts a braking action and diminishes shock.

The casing 1, 2 for the float cone 3 is connected with the casing 16 for the pipe fracture safety device by a by-pass connection 29, in which a shut-off device 30 is arranged. The object of this device is to obtain an automatic re-opening of the float valve after a sudden excessive withdrawal of liquid, which has brought about the closure of the valve, as soon as the cause of the excessive withdrawal has been removed. During the operation the shut-off device 30 in the by-pass connection 29 is always open, so that a certain quantity of liquid can overflow from the casing 1, 2 of the float valve to the casing 16 of the pipe fracture safety device. When therefore the float valve 3 closes, the pipe line beyond the float valve cone automatically fills up again and thereby brings about an equalization of pressure. The compressed spring 20 can now partly expand, and forces the float valve cone 3 back into its operative position again.

In all the valves according to the present invention the buoyancy of the cone may be obtained without weight loading, not merely by making it hollow, as indicated in the drawings, but also by employing solid bodies which are lighter than the liquid.

What I claim is:—

1. A non-return valve for hydraulic mains, comprising a valve body of stream-line shape, adapted to act as a float, means for guiding said valve body in an axial direction and means for varying the buoyancy of the valve body.

2. A non-return valve for hydraulic mains, comprising a double conical valve body adapted to act as a float, means at both ends of the valve body for guiding said valve body in a horizontal direction and means for varying the buoyancy of the valve body.

3. A non-return valve for hydraulic mains, comprising a valve casing, a double conical valve body adapted to act as a float, means for guiding said valve body in an axial direction, and externally cylindrical weighting means applied to said valve body to facilitate the frictionless guidance of said valve body in the valve casing.

4. A non-return valve for hydraulic mains, comprising a valve casing, a double conical valve body adapted to act as a float, means for guiding said valve body in a horizontal direction, and externally cylindrical exchangeable weighting rings applied to both ends of said valve body to facilitate the frictionless guidance of said valve body in the valve casing, and to enable its weight and buoyancy to be adjusted.

5. A non-return valve for hydraulic mains, comprising a valve casing, a double conical valve body adapted to act as a float, and ribs set somewhat obliquely to the longitudinal axis of the valve casing for guiding said valve body in an axial direction and imparting a rotary movement thereto.

6. A non-return valve for hydraulic mains, comprising a valve casing, a double-conical valve body adapted to act as a float, ribs set somewhat obliquely to the longitudinal axis of the valve casing for guiding said valve body in a horizontal direction and imparting a rotary movement thereto, and externally cylindrical exchangeable weighting rings applied to both ends of said valve body to facilitate the frictionless guidance of said valve body in the valve casing, and to enable its weight and buoyancy to be adjusted.

7. A non-return valve for hydraulic mains adapted to act as an automatic stop valve for protective purposes in the event of the pipe fracture, comprising a double conical valve body adapted to act as a float, means for guiding said valve body in an axial direction, a longitudinally displaceable rod bearing against one apex of the double conical valve body, means for exerting an axial pressure upon the valve body through said rod, and means for adjusting the magnitude of the pressure exerted by said pressure-exerting means according to the pressure of flow.

8. A non-return valve for hydraulic mains adapted to act as an automatic stop valve for protective purposes in the event of pipe fracture, comprising a double conical valve body adapted to act as a float, means for guiding said valve body in an axial direction, a longitudinally displaceable rod bearing against one apex of the double conical valve body, a spring for exerting an axial pressure upon the valve body through said rod, and means for adjusting the stress in said spring according to the pressure of flow.

9. A non-return valve for hydraulic mains adapted to act as an automatic stop valve for protective purposes in the event of pipe fracture, comprising a double conical valve body adapted to act as a float, means for guiding said valve body in an axial direction, a longitudinally displaceable rod bearing against one apex of the double conical valve body, means for exerting an axial pressure upon the valve body through said rod, and means adapted to be actuated from the exterior for adjusting the magnitude of the pressure exerted by said pressure-exerting means according to the pressure of flow.

10. A non-return valve for hydraulic mains adapted to act as an automatic stop valve for protective purposes in the event of pipe fracture, comprising a double conical valve body adapted to act as a float, means for guiding said valve body in an axial direction, a longitudinally displaceable rod bearing against one apex of the double conical valve body, a spring for exerting an axial pressure upon the valve body through said rod, and means adapted to be actuated from the exterior for adjusting the magnitude of the pressure exerted by said spring according to the pressure of flow.

11. A non-return valve for hydraulic mains adapted to act as an automatic stop valve for protective purposes in the event of pipe fracture, comprising a double conical valve body adapted to act as a float, means for guiding said valve body in an axial direction, a longitudinally displaceable rod bearing against one apex of the double conical valve body, a spring for exerting an axial pressure upon the valve body through said rod, and worm gearing adapted to be actuated from the exterior for adjusting the magnitude of the pressure exerted by said spring according to the pressure of flow.

12. A non-return valve for hydraulic mains adapted to act as an automatic stop valve for protective purposes in the event of pipe fracture, comprising a double conical valve body adapted to act as a float, means for guiding said valve body in an axial direction, a guiding cylinder, a longitudinally displaceable rod bearing against one apex of the double conical valve body, and means for exerting an axial pressure upon the valve body through said rod, said rod being formed at the end remote from the valve body as a piston sliding in the guiding cylinder and adapted to act as a liquid brake when the float valve cone closes.

13. A non-return valve for hydraulic mains adapted to act as an automatic stop valve for protective purposes in the event of pipe fracture, comprising a double conical valve body adapted to act as a float, means for guiding said valve body in an axial direction, a guiding cylinder, a longitudinally displaceable rod bearing against one apex of the double conical valve body, a spring for exerting an axial pressure upon the valve body through said rod, and worm gearing adapted to be actuated from the exterior for adjusting the magnitude of the pressure exerted by said spring according to the pressure of the flow, the longitudinally displaceable rod being formed at the end remote from the valve body as a piston sliding in the guiding cylinder and adapted to act as a liquid brake when the float valve cone closes.

14. A non-return valve for hydraulic mains adapted to act as an automatic stop valve for protective purposes in the event of pipe fracture, comprising a double conical valve body adapted to act as a float, means for guiding said valve body in an axial direction, a guiding cylinder, a longitudinally displaceable rod bearing against one apex of the double conical valve body, means for exerting an axial pressure upon the valve body through said rod, said rod being formed at the end remote from the valve body as a piston sliding in the guiding cylinder and adapted to act as a liquid brake when the float valve cone closes, a needle valve for regulating the speed of closing of the automatic stop valve by varying the size of the outlet aperture of the liquid brake, and means for adjusting said needle valve from the exterior.

15. A non-return valve for hydraulic mains adapted to act as an automatic stop valve for protective purposes in the event of pipe fracture, comprising a double conical valve body adapted to act as a float, means for guiding said valve body in an axial direction, a guiding cylinder, a longitudinally displaceable rod bearing against one apex of the double conical valve body, a spring for exerting an axial pressure upon the valve body through said rod, worm gearing adapted to be actuated from the exterior for adjusting the magnitude of the pressure exerted by said spring according to the pressure of flow, the longitudinally displaceable rod being formed at the end remote from the valve body as a piston sliding in the guiding cylinder and adapted to act as a liquid brake when the float valve cone closes, a needle valve for regulating the speed of closing of the automatic stop valve by varying the size of the outlet aperture of the liquid brake, and means for adjusting said needle valve from the exterior.

16. A non-return valve for hydraulic mains adapted to act as an automatic stop valve for protective purposes in the event of pipe fracture, a double conical valve body adapted to act as a float, means for guiding said valve body in an axial direction, a longitudinally displaceable rod bearing against one apex of the double conical valve body, means for exerting an axial pressure upon the valve body through said rod, means for adjusting the magnitude of the pressure exerted by said pressure-exerting means according to the pressure of flow, a by-pass connection between the spaces before and behind the seat of the automatic stop valve, and means for regulating and preventing the flow of liquid through said by-pass connection.

17. A non-return valve for hydraulic mains adapted to act as an automatic stop valve for protective purposes in the event of pipe fracture, comprising a double conical valve body adapted to act as a float, means for guiding said valve body in an axial direction, a guiding cylinder, a longitudinally displaceable rod bearing against one apex of the double conical valve body, a spring for exerting an axial pressure upon the valve body through said rod, worm gearing adapted to be actuated from the exterior for adjusting the magnitude of the pressure exerted by said spring according to the pressure of flow, the longitudinally displaceable rod being formed at the end remote from the valve body as a piston sliding in the guiding cylinder and adapted to act as a liquid brake when the float valve cone closes, a needle valve for regulating the speed of closing of the automatic stop valve by varying the size of the outlet aperture of the liquid brake, means for adjusting said needle valve from the exterior, a by-pass connection between the spaces before and behind the seat of the automatic stop valve, and means for regulating and preventing the flow of liquid through said by-pass connection.

In testimony whereof I have signed my name to this specification.

KARL HASSOLD.